(12) United States Patent
Meise et al.

(10) Patent No.: US 8,454,467 B2
(45) Date of Patent: Jun. 4, 2013

(54) POWER SPLIT TRANSMISSION

(75) Inventors: Andreas Meise, Bochum (DE);
Jan-Hendrik Jansen, Duesseldorf (DE);
Stefan Frank, Iserlohn (DE); Manuel Matalla, Witten (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 12/988,823

(22) PCT Filed: Apr. 24, 2009

(86) PCT No.: PCT/EP2009/003011
§ 371 (c)(1),
(2), (4) Date: Jan. 10, 2011

(87) PCT Pub. No.: WO2009/130040
PCT Pub. Date: Oct. 29, 2009

(65) Prior Publication Data
US 2011/0118073 A1 May 19, 2011

(30) Foreign Application Priority Data

Apr. 25, 2008 (DE) .......................... 10 2008 021 010

(51) Int. Cl.
*F16H 47/04* (2006.01)
*F16H 57/08* (2006.01)

(52) U.S. Cl.
USPC ................ 475/82; 475/73; 475/339; 475/903

(58) Field of Classification Search
USPC ............. 475/72, 73, 80, 81, 82, 83, 339, 340, 475/903
See application file for complete search history.

(56) References Cited

U.S. PATENT DOCUMENTS

| 3,675,507 | A | 7/1972 | Takekawa |
| 4,994,002 | A * | 2/1991 | Valotto et al. .................... 475/72 |
| 5,730,678 | A | 3/1998 | Larkin |
| 7,361,111 | B2 | 4/2008 | Aitzetmueller |
| 7,588,510 | B2 * | 9/2009 | Johnson ........................... 475/82 |

(Continued)

FOREIGN PATENT DOCUMENTS

| DE | 27 19 823 | 11/1978 |
| DE | 4401509 A1 * | 8/1994 |

(Continued)

*Primary Examiner* — Roger Pang
(74) *Attorney, Agent, or Firm* — Michael J. Striker

(57) ABSTRACT

The present invention relates to a power split transmission for a motor vehicle, having a mechanical and a hydrostatic power branch (3, 4) disposed parallel to each other and contacting a mutual drive shaft (1), wherein the hydrostatic power branch (4) consists of a hydro motor (6) coupled to a hydro pump (5) and is connected to the drive shaft (1) via a gear stage (7), wherein the branched power from the mechanical and hydrostatic power branch (3, 4) can be combined into a gear drive (13) disposed on the face side, said gear drive being subsequently connected to a drive shaft (2), wherein the mechanical power branch (3) further consists of two planetary gears (8, 9) having sun gears (10, 12), planetary gears (16, 17), and hollow gears (21, 22), wherein the sun gear (10) of the first planetary gear transmission (8) is placed directly on the drive shaft (1) while the sun gear (12) of the second planetary gear transmission (9) is in contact with the gear drive (13) via a sun shaft (11), and wherein the planetary gears (16, 17) of both stages (8, 9) are disposed in a coaxial manner and are supported on a mutual planetary carrier shaft (18).

18 Claims, 1 Drawing Sheet

U.S. PATENT DOCUMENTS

| | | | |
|---|---|---|---|
| 7,722,493 B2 | 5/2010 | Liebherr et al. | |
| 7,892,130 B1 * | 2/2011 | Gollner et al. | 475/73 |
| 7,988,580 B2 * | 8/2011 | McCrary | 475/72 |
| 8,206,253 B2 * | 6/2012 | Lindsay et al. | 475/73 |
| 8,277,352 B2 * | 10/2012 | Ivantysynova et al. | 475/73 |

FOREIGN PATENT DOCUMENTS

| | | |
|---|---|---|
| DE | 20 2005 021 249 | 8/2007 |
| WO | 97/32145 | 9/1997 |
| WO | 2006/042434 | 4/2006 |

\* cited by examiner

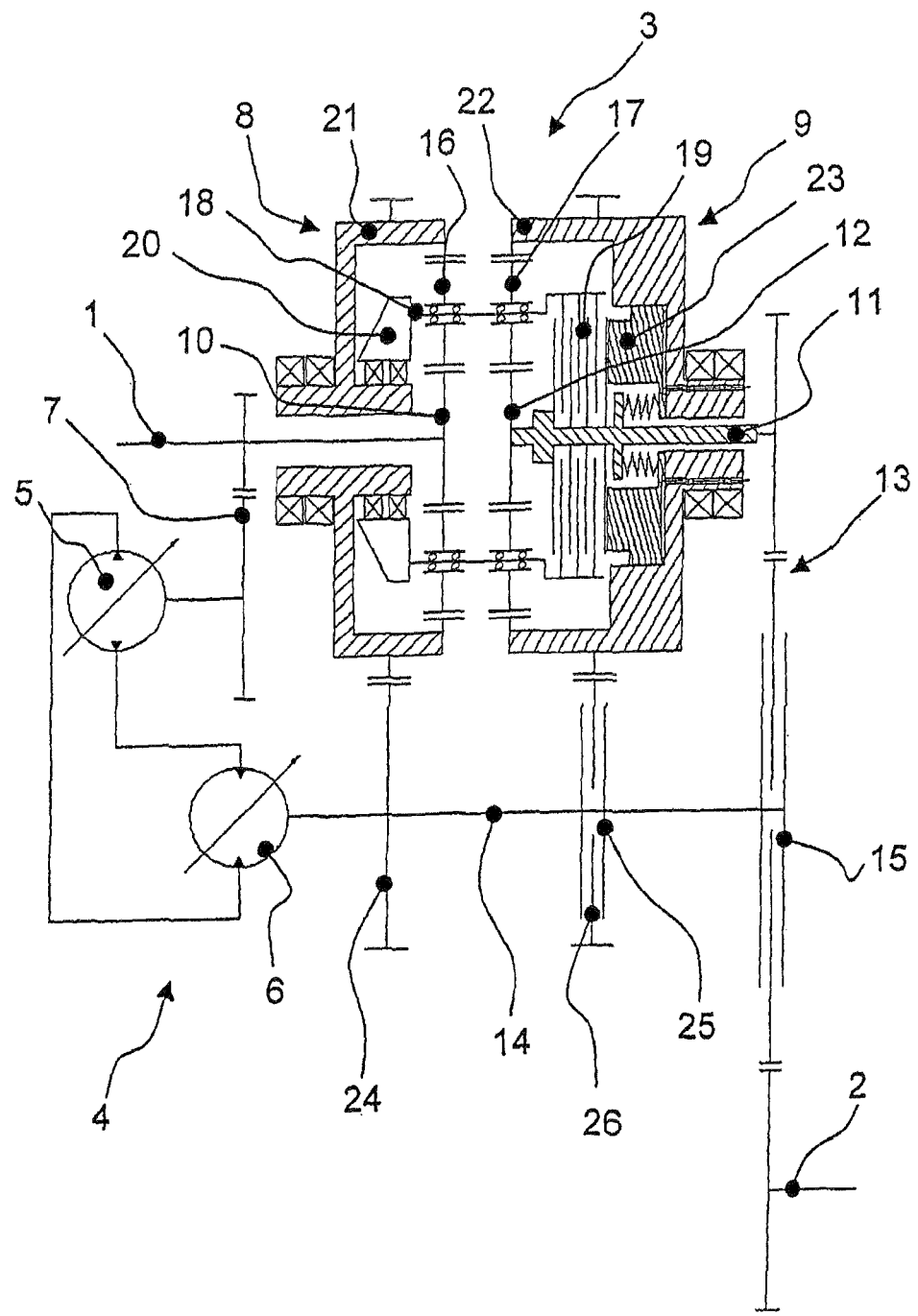

POWER SPLIT TRANSMISSION

CROSS-REFERENCE

The invention described and claimed hereinbelow is also described in PCT/EP2009/003011, filed on Apr. 24, 2009 and DE 10 2008 021 010.2, filed on Apr. 25, 2008. This German Patent Application, whose subject matter is incorporated here by reference, provides the basis for a claim of priority of invention under 35 U.S.C. 119 (a)-(d).

FIELD OF THE INVENTION

The invention relates to a power split transmission for a motor vehicle, comprising a mechanical and a hydrostatic power branch which are disposed parallel to one another and are in contact via a common drive shaft, wherein the hydrostatic power branch is composed of a hydraulic motor coupled to a hydraulic pump and is connected to the drive shaft via a gear stage, wherein the split power from the mechanical power branch and the hydrostatic power branch can be combined in a gear drive situated on the end face, which is connected downstream to an output shaft.

BACKGROUND INFORMATION

Publication DE 27 19 823 C2 makes known a power split transmission, in which a hydrostatic transmission composed of a hydraulic pump and a hydraulic motor is disposed between a drive unit having a drive shaft and an output shaft. Furthermore, a hydrodynamic transmission which is composed of a hydrodynamic converter is connected in parallel via a spur gear stage. A further spur gear stage for connection to the output shaft is provided on the output side of the hydrodynamic transmission, wherein, with respect to the hydrodynamic transmission, the spur gear is connected to the output shaft of the hydrodynamic converter via an overrunning clutch.

Furthermore, publication DE 20 2005 021 249 U1 makes known a power split transmission for motor vehicles, in which a mechanical and a hydrostatic power split are disposed in parallel. In that case, a double clutch transmission is provided between a drive shaft and the mechanical power branch, and can be used to connect two transmission shafts. Constant-velocity devices are provided on each of the aforementioned transmission shafts to connect idler gears disposed on the transmission shafts to the particular transmission shaft in a form-locking manner. By connecting the idler gears in this manner, the power of the drive shaft is transmitted to a hollow shaft situated parallel thereto. A hydrostatic power branch is disposed inside aforementioned hollow shaft, via which a spur gear stage is connected to the drive shaft. The power from the mechanical branch and the hydrostatic branch are combined in a planetary gear assembly, the hydrostatic power branch being connected to the sun gear, and the hollow shaft of the mechanical power branch being connected to the ring gear. The planetary gears of the planetary gear assembly are connected to an output shaft to draw the output power from the power split transmission.

The disadvantage of the known prior art is that power losses result when a hydrodynamic power branch is used, due to the warming of the oil. When a mechanical power branch comprising spur gear stages is used, a certain amount of axial installation space is required, which is not available in many vehicles.

SUMMARY OF THE INVENTION

The object of the present invention therefore is to create a power split transmission for a motor vehicle that requires only a small amount of installation space.

The invention comprises the technical teaching that the mechanical power branch is composed of two planetary gear assemblies, wherein the sun gear of the first planetary gear assembly is placed directly on the drive shaft, while the sun gear of the second planetary gear assembly is connected to an output shaft via a sun shaft using a gear drive. The planetary gears of the two stages are disposed coaxially to one another and are supported on a common planet carrier shaft. Due to the use of two planetary gear assemblies, a compact design of the mechanical power branch is made possible and the power introduced via this branch can be controlled accordingly.

According to a further advantageous embodiment of the invention, the planet carrier shaft is supported with respect to the first planetary gear assembly via a planet carrier in the ring gear of the first planetary gear assembly, and, with respect to the second planetary gear assembly, can be connected directly to the sun shaft via a clutch. In this manner, reliable support of the planet carrier shaft is ensured, and conversion of the power by the second planet stage can be bridged via the direct connection to the sun shaft of the second planetary gear assembly.

According to a development of the invention, the clutch can be connected by a cylinder which is disposed in the ring gear of the second planetary gear assembly. As a result, a highly compact system for engaging the clutch can be realized.

According to a further advantageous embodiment of the invention, the ring gear of the first planetary gear assembly comprises external toothing, via which it is coupled via a gear wheel directly to an output-side shaft of the hydrostatic power branch. Using this measure, the power flowing through the first planetary gear assembly can be influenced since the rotational speed of the ring gear is coupled via a gear stage to the rotational speed of the output-side shaft of the hydrostatic branch.

According to a development of the invention, the ring gear of the second planetary gear assembly likewise comprises external toothing, via which it can be connected using a gear wheel and a clutch directly to the output-side shaft of the hydrostatic power branch. As a result, the power that is directed through the second planetary gear assembly can also be influenced by the hydrostatic power branch, wherein targeted engagement is possible.

According to a further advantageous embodiment of the invention, the hydrostatic power branch can be connected to the output shaft via a clutch using the gear drive. Using this measure, a targeted engagement of the hydrostatic branch can be actuated to the point of driving the output shaft, or the output shaft can be driven solely via the hydrostatic branch.

According to a development of the invention, the hydraulic motor and/or the hydraulic pump are controllable. This has the advantage that the power directed through the hydrostatic branch can be controlled in a targeted manner.

Further measures which improve the invention are described in greater detail below with reference to the FIGURE and in combination with the description of an embodiment.

BRIEF DESCRIPTION OF THE DRAWINGS

FIG. 1 is a schematic view of the power split transmission according to the invention.

DETAILED DESCRIPTION OF THE PREFERRED EMBODIMENTS

The sole FIGURE shows a schematic view of the power split transmission according to the invention, which is disposed between a drive shaft 1 and an output shaft 2. The power split transmission comprises a mechanical power branch 3 and a hydrostatic branch 4. Hydrostatic branch 4 includes a hydraulic pump 5 which is hydraulically coupled to a hydraulic motor 6, and is connected via a spur gear stage 7 to drive shaft 1. Mechanical branch 3 is composed of two planetary gear assemblies 8 and 9, wherein a sun gear 10 of first planetary gear assembly 8 is disposed directly on drive shaft 1. On the output side, sun shaft 11, on which sun gear 12 of second planetary gear assembly 9 is placed, is coupled via a gear drive 13 to output shaft 2. In regards to hydrostatic branch 4, a connection between output-side shaft 14 and output shaft 2 can be established to gear drive 13 using an engagable clutch 15. To convert the power directed through mechanical branch 3, planet gears 16 and 17 of planet gear assemblies 8 and 9 are both disposed, coaxially relative to one another, on a planet carrier shaft 18. With respect to second planetary gear assembly 9, planet carrier shaft 18 can be connected directly to sun shaft 11 using shifting clutch 19; with respect to first planetary gear assembly 8, it is supported in ring gear 21 via a planet carrier 20. To actuate the shifting clutch, a cylinder 23 is disposed in ring gear 22 of second planetary gear assembly 9. Ring gears 21 and 22 also each have toothing on their outer circumference. Via aforementioned toothing, ring gear 21 is permanently connected via a gear wheel 24 to output-side shaft 14 of hydrostatic branch 4. Using a further clutch 25, it is also possible to establish a coupling between output-side shaft 14 and ring gear 22 of second planetary gear assembly 9 using gear wheel 26.

Using the above-described system, power summation can take place in three ways:

To select a first gear ratio, clutch 15 is engaged, while clutches 19 and 25 are disengaged. In this case, power flows through hydrostatic branch 4 since no power is transmitted in the region of mechanical branch 3 since ring gear 22 rotates freely.

To select a second gear ratio, clutch 19 is engaged, while the other two clutches 15 and 25 are disengaged. The power flow is bundled in first planetary gear assembly 8, the power flow being composed of the component delivered by sun gear 10, and of a drive of ring gear 21 by hydrostatic branch 4 via gear wheel 24. Since clutch 19 is engaged, this summed power is transmitted directly to sun shaft 11 using planet carrier shaft 18, and to output shaft 2 via gear drive 13.

To select a further gear ratio, clutch 25 is engaged, while clutches 15 and 19 remain disengaged. In this case, ring gears 21 and 22 are each operated using hydrostatic branch 4, and therefore the power from sun gear 10 and ring gear 21 is summed in first planetary gear assembly 8, and is transmitted via planet carrier shaft 18 to second planetary gear assembly 9. In second planetary gear assembly 9, this power is bundled together with the power flow via ring gear 22 and is ultimately transmitted to sun shaft 11. Proceeding from sun shaft 11, power is ultimately output via gear drive 13 to output shaft 2.

LIST OF REFERENCE CHARACTERS

1 Drive shaft
2 Output shaft
3 Mechanical power branch
4 Hydrostatic power branch
5 Hydraulic pump
6 Hydraulic motor
7 Spur gear stage
8 First planetary gear assembly
9 Second planetary gear assembly
10 Sun gear
11 Sun shaft
12 Sun gear
13 Gear drive
14 Output-side shaft
15 Clutch
16 Planet gear
17 Planet gear
18 Planet carrier shaft
19 Shifting clutch
20 Planet carrier
21 Ring gear
22 Ring gear
23 Cylinder
24 Gear wheel
25 Clutch
26 Gear wheel

What is claimed is:

1. A power split transmission for a motor vehicle, comprising:
a mechanical and a hydrostatic power branch (3, 4) which are disposed parallel to one another and are in contact via a common drive shaft (1), wherein the hydrostatic power branch (4) is composed of hydraulic motor (6) coupled to a hydraulic pump (5) and is connected to the drive shaft (1) via a gear stage (7), wherein the split power from the mechanical and the hydrostatic power branch (3, 4) can be combined in a gear drive (13) which is disposed on an end face and is connected downstream to an output shaft (2),
wherein the mechanical power branch (3) is composed of first and second planetary gear assemblies (8, 9) having sun gears (10, 12), planet gears (16, 17), and ring gears (21, 22), wherein the sun gear (10) of the first planetary gear assembly (8) is placed directly on the drive shaft (1), while the sun gear (12) of the second planetary gear assembly (9) is in contact with the gear drive (13) via a sun shaft (11), and wherein the planet gears (16, 17) of both gear assemblies (8, 9) are disposed coaxially relative to one another and are supported on a common planet carrier shaft (18),
wherein the planet carrier shaft (18) is supported on a side of the first planetary gear assembly (8) via a planet carrier (20) in the ring gear (21) of the first planetary gear assembly (8), and can be connected on a side of the second planetary gear assembly (9) via a clutch (19) directly to the sun shaft (11).

2. The power split transmission according to claim 1, wherein the clutch (19) can be engaged by a cylinder (23) which is disposed in the ring gear (22) of the second planetary gear assembly (9).

3. The power split transmission according to claim 1, wherein the ring gear (21) of the first planetary gear assembly (8) comprises external toothing, via which it is coupled via a gear wheel (24) directly to an output-side shaft (14) of the hydrostatic power branch (4).

4. The power split transmission according to claim 1, wherein the ring gear (22) of the second planetary gear assembly (9) comprises external toothing, via which it is coupled via a gear wheel (26) and a clutch (25) directly to an output-side shaft (14) of the hydrostatic power branch (4).

5. The power split transmission according to claim 1, wherein the hydrostatic power branch (4) can be connected to an output shaft (2) via a clutch (15) using the gear drive (13).

6. The power split transmission according to claim 1, wherein the hydraulic motor (6) and/or the hydraulic pump (5) are controllable.

7. The power split transmission according to claim 1, wherein the hydrostatic power branch (4) can be connected to an output shaft (2) via a clutch (15) using the gear drive (13).

8. A power split transmission for a motor vehicle, comprising:
- a mechanical and a hydrostatic power branch (3, 4) which are disposed parallel to one another and are in contact via a common drive shaft (1), wherein the hydrostatic power branch (4) is composed of hydraulic motor (6) coupled to a hydraulic pump (5) and is connected to the drive shaft (1) via a gear stage (7), wherein the split power from the mechanical and the hydrostatic power branch (3, 4) can be combined in a gear drive (13) which is disposed on an end face and is connected downstream to an output shaft (2),
- wherein the mechanical power branch (3) is composed of first and second two planetary gear assemblies (8, 9) having sun gears (10, 12), planet gears (16, 17), and ring gears (21, 22), wherein the sun gear (10) of the first planetary gear assembly (8) is placed directly on the drive shaft (1), while the sun gear (12) of the second planetary gear assembly (9) is in contact with the gear drive (13) via a sun shaft (11), and wherein the planet gears (16, 17) of both gear assemblies (8, 9) are disposed coaxially relative to one another and are supported on a common planet carrier shaft (18),
- wherein the ring gear (21) of the first planetary gear assembly (8) comprises external toothing, via which it is coupled via a gear wheel (24) directly to an output-side shaft (14) of the hydrostatic power branch (4).

9. The power split transmission according to claim 8, wherein the planet carrier shaft (18) is supported on a side of the first planetary gear assembly (8) via a planet carrier (20) in the ring gear (21) of the first planetary gear assembly (8), and can be connected on a side of the second planetary gear assembly (9) via a clutch (19) directly to the sun shaft (11).

10. The power split transmission according to claim 8, wherein the clutch (19) can be engaged by a cylinder (23) which is disposed in the ring gear (22) of the second planetary gear assembly (9).

11. The power split transmission according to claim 8, wherein the ring gear (22) of the second planetary gear assembly (9) comprises external toothing, via which it is coupled via a gear wheel (26) and a clutch (25) directly to the output-side shaft (14) of the hydrostatic power branch (4).

12. The power split transmission according to claim 8, wherein the hydrostatic power branch (4) can be connected to an output shaft (2) via a clutch (15) using the gear drive (13).

13. The power split transmission according to claim 8, wherein the hydraulic motor (6) and/or the hydraulic pump (5) are controllable.

14. A power split transmission for a motor vehicle, comprising:
- a mechanical and a hydrostatic power branch (3, 4) which are disposed parallel to one another and are in contact via a common drive shaft (1), wherein the hydrostatic power branch (4) is composed of hydraulic motor (6) coupled to a hydraulic pump (5) and is connected to the drive shaft (1) via a gear stage (7), wherein the split power from the mechanical and the hydrostatic power branch (3, 4) can be combined in a gear drive (13) which is disposed on an end face and is connected downstream to an output shaft (2),
- wherein the mechanical power branch (3) is composed of first and second two planetary gear assemblies (8, 9) having sun gears (10, 12), planet gears (16, 17), and ring gears (21, 22), wherein the sun gear (10) of the first planetary gear assembly (8) is placed directly on the drive shaft (1), while the sun gear (12) of the second planetary gear assembly (9) is in contact with the gear drive (13) via a sun shaft (11), and wherein the planet gears (16, 17) of both gear assemblies (8, 9) are disposed coaxially relative to one another and are supported on a common planet carrier shaft (18),
- wherein the ring gear (22) of the second planetary gear assembly (9) comprises external toothing, via which it is coupled via a gear wheel (26) and a clutch (25) directly to an output-side shaft (14) of the hydrostatic power branch (4).

15. The power split transmission according to claim 14, wherein the planet carrier shaft (18) is supported on a side of the first planetary gear assembly (8) via a planet carrier (20) in the ring gear (21) of the first planetary gear assembly (8), and can be connected on a side of the second planetary gear assembly (9) via a clutch (19) directly to the sun shaft (11).

16. The power split transmission according to claim 14, wherein the clutch (19) can be engaged by a cylinder (23) which is disposed in the ring gear (22) of the second planetary gear assembly (9).

17. The power split transmission according to claim 14, wherein the ring gear (21) of the first planetary gear assembly (8) comprises external toothing, via which it is coupled via a gear wheel (24) directly to an output-side shaft (14) of the hydrostatic power branch (4).

18. The power split transmission according to claim 14, wherein the hydraulic motor (6) and/or the hydraulic pump (5) are controllable.

* * * * *